United States Patent
Gupta et al.

(10) Patent No.: US 7,193,966 B2
(45) Date of Patent: Mar. 20, 2007

(54) TRIGGERED PACKET DATA RATE CHANGE IN A COMMUNICATION SYSTEM

(75) Inventors: Praveen Gupta, San Diego, CA (US); Todd Ruth, Valley Center, CA (US)

(73) Assignee: Telefonakitebolaget LM Ericsson (publ) (SE)

( * ) Notice: Subject to any disclaimer, the term of this patent is extended or adjusted under 35 U.S.C. 154(b) by 995 days.

(21) Appl. No.: 09/888,922

(22) Filed: Jun. 25, 2001

(65) Prior Publication Data

US 2003/0007456 A1 Jan. 9, 2003

(51) Int. Cl.
*H04J 1/16* (2006.01)
*H04J 3/14* (2006.01)

(52) U.S. Cl. ............... 370/231; 370/232; 370/332; 370/437; 370/465; 455/435.1

(58) Field of Classification Search ............... 370/230, 370/231, 232, 233, 329, 332, 333, 464–465, 370/468, 437; 455/435, 432, 435.1
See application file for complete search history.

(56) References Cited

U.S. PATENT DOCUMENTS

| | | | | |
|---|---|---|---|---|
| 5,842,128 A | * | 11/1998 | Kito et al. | 455/435.1 |
| 5,870,666 A | * | 2/1999 | Tanaka et al. | 455/67.11 |
| 5,974,106 A | | 10/1999 | Gerhards et al. | |
| 6,304,549 B1 | * | 10/2001 | Srinivasan et al. | 370/230 |
| 6,347,091 B1 | * | 2/2002 | Wallentin et al. | 370/437 |
| 6,690,938 B1 | * | 2/2004 | Chin | 455/450 |

FOREIGN PATENT DOCUMENTS

| | | |
|---|---|---|
| EP | 1079563 | 2/2001 |
| EP | 1085687 | 3/2001 |
| WO | WO 9940743 | 8/1999 |

\* cited by examiner

*Primary Examiner*—John Pezzlo
*Assistant Examiner*—Inder Pal Mehra
(74) *Attorney, Agent, or Firm*—Coats & Bennett, P.L.L.C.

(57) ABSTRACT

Communication traffic associated with one or more mobile terminals is monitored to efficiently manage allocated radio resources. A rate management technique dynamically adjusts allocated radio resources to increase or decrease the data rate capacity of allocated radio channels based on actual channel usage. In this manner, radio resources are more efficiently utilized because the amount of excess capacity allocated to individual subscribers is reduced. Monitoring communication traffic may also be used to determine whether additional radio channel resources are allocated to a given subscriber. For example, in a cdma2000 radio access network, subscribers are typically allocated fundamental radio channels and then assigned supplemental channels to access higher data rate services. By monitoring fundament channel traffic characteristics, such as the queue length or packet size of outgoing packet data, the radio access network can determine whether supplemental channel allocation is warranted.

44 Claims, 7 Drawing Sheets

TRIGGERED PACKET DATA RATE CHANGE IN A COMMUNICATION SYSTEM

BACKGROUND OF THE INVENTION

The present invention relates to wireless communication systems in general, and particularly relates to such systems that employ variable rate or variable bandwidth radio channels.

As wireless communication systems evolve, the range of services offered by such systems expands. The increasing diversity, sophistication, and quality of available services have attracted a rapidly growing number of people who use wireless communications in their everyday lives. For example, today's mobile terminal user may subscribe to a wide range of voice and data services, including Internet access, email, and other data services in addition to more conventional voice services. It is expected that the demand for wireless communication services will continue to grow as new services are added and existing services are improved.

While the demand for data services continues to grow, the resources available to provide such services are finite. These resources include both the call processing and management resources, generally referred to as network resources, as well as the radio resources necessary to communicate with individual mobile terminals.

In next generation communication systems, the number of channels or bandwidth allocated to a user varies, depending on the services being provided to that user. For example, in cdma2000-based (IS-2000) networks, a user might be allocated a fundamental channel to support low data rate services, such as voice. For higher data rate services, the user might be allocated a fundamental channel and one or more supplemental channels to support the higher data rates. Thus, in contrast to older communication systems, these newer communication networks may allocate substantial resources to a single user, potentially reducing the total number of users that may be simultaneously supported.

SUMMARY OF THE INVENTION

The present invention comprises a method and apparatus for managing radio channel allocation and configuration in a radio access network. In one aspect, the present invention provides rate management functions that dynamically adjust the data rate capacity of an allocated radio channel upwards or downwards to its most appropriate rate setting. The appropriateness of the current data rate setting may be evaluated in terms of channel utilization, observed error, or any combination thereof. By selecting the best matching of available data rate settings for allocated radio channels, the radio access network's resources are more efficiently utilized. So, rather than maintaining a high data rate capacity on a channel that is being underutilized or suffers from excessive error, that channel's data rate may be reduced and the freed resources put to better use elsewhere.

Radio channel management may utilize a number of variables intended to balance the desire to maintain the minimal resource allocation for a given channel against the need to limit additional processing and signaling overhead associated with reducing or increasing radio channel capacity. These variables may include timing parameters that permit tracking the time since a last channel adjustment was made upwards or downwards, and may be used to prevent the rate management function from implementing rate control changes too frequently. Additional variables used in the dynamic rate management and radio channel allocation techniques of the present invention may further include subscriber-specific values, such as might be taken from home location register information. Thus, if a given subscriber has paid for premium access, higher access rates may be assigned or maintained for that subscriber.

Radio channel management in accordance with the present invention may be practiced in any number of radio network types, with cdma2000 and Wideband CDMA (W-CDMA) being primary examples. In these types of radio networks, individual subscribers may be allocated one or more radio channels or one or more channel types or data rate capacities. By incorporating the rate management techniques of the present invention, the radio channel resources allocated to individual subscribers may be maintained at or near the actual capacity needed by each subscriber.

The present invention may also incorporate channel allocation techniques that determine the type or number of radio channels initially allocated to a given subscriber by the radio access network. These techniques may find particular use in radio access networks where subscribers may be initially allocated a basic rate channel, such as a fundamental channel in a cdma2000 network, which is then altered or supplemented with additional radio channel capacity if needed. Thus, given subscribers may be allocated additional radio channel data rate capacity based on actual need. Then, these higher data rate channel resources may be dynamically rate managed as above.

DETAILED DESCRIPTION OF THE INVENTION

The present invention may be applied to a variety of radio access network types. These network types include but are not limited to so-called third generation (3G) wireless cellular communication networks, such as those radio access networks based on the cdma2000 or W-CDMA standards. Thus, it should be understood that the following discussion of particular system types and implementations is only for illustrative purposes. It should also be understood that where illustrative variables are involved, such as various timers or counters, and minimum and maximum values, these value are configurable as specific implementations might require.

Figure 1:
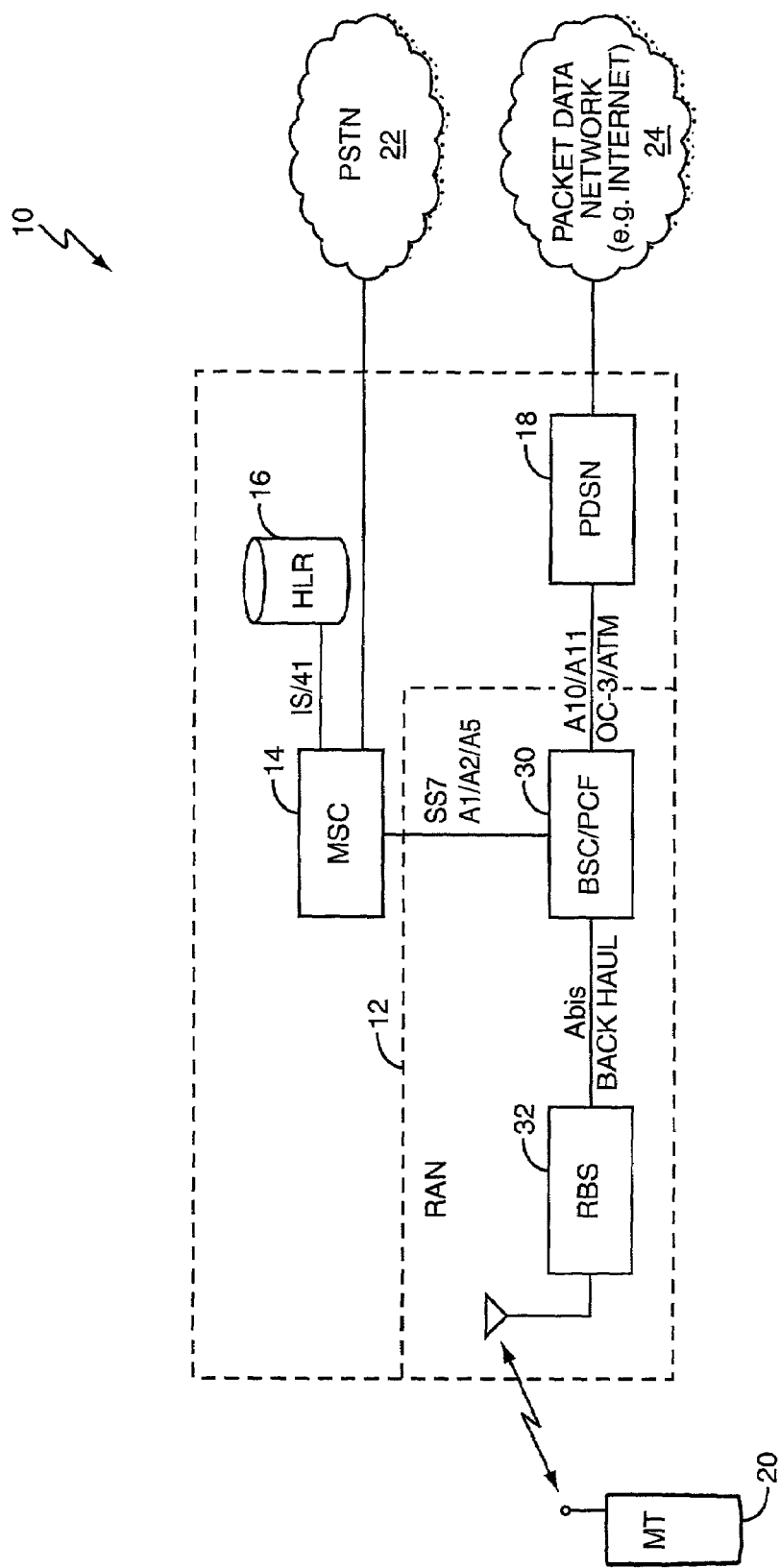
FIG. 1 is a diagram of an exemplary wireless communication network.

Turning now to the drawings, FIG. 1 illustrates a wireless communication network generally referred to the by numeral 10. The network 10 comprises a radio access network (RAN) 12, and a core network comprising a mobile switching center (MSC) 14 and associated home location register (HLR) 16, and a packet data serving node (PDSN)

18. The network 10 provides communication between one or more mobile terminals 20 and one or more external communication networks, such as the Public Switched Telephone Network (PSTN) 22 and one or more packet data networks (PDNs) 24, such as the Internet.

The RAN 12 supports communication with the mobile terminals 20 via RF signaling. A typical RAN 12 comprises one or more base station controllers (BSCs) 30 and a number of associated radio base stations (RBSs) 32. The BSC 30 provides connection management services, communication signal processing, and radio link management functions. Operating under control of the BSC 30, the RBS 32 provides the radio resources used to establish and maintain communication between the mobile terminals 20 and the RAN 12. Typically, radio resources are allocated to a given mobile terminal 20 in the form of one or more radio channels.

Within this discussion, the term radio channel generally denotes the physical signaling resources allocated to establish a dedicated data or control link to a given mobile terminal 20. For example, if the RAN 12 uses a code division multiple access (CDMA) air interface, a radio channel includes the RF transceiver resources necessary to generate and receive signals to and from the mobile terminal 20, along with the unique spreading codes necessary to operate within the multiple-access environment inherent in CDMA systems. Walsh codes, which are orthogonal code sequences, are commonly used as CDMA spreading codes, with one Walsh code used to uniquely encode each defined radio channel.

In addition to managing the radio resources, the BSC 30 also configures and allocates network resources in association with its call management functions. As such the BSC 30 cooperates with the MSC 14 in call setup and teardown operations, as well as cooperating with the PDSN 18 to establish needed network channels to support packet data communications with the PDN 24. Call processing and management functions provided by the BSC 30 further include configuring and maintaining backhaul connections between it and the RBSs 32.

In operation, then, the BSC 30 allocates logical and physical network and radio resources as needed to the various mobile terminals 20 in active communication with the RAN 12. By properly allocating these resources, the BSC 30 supports and manages communication traffic to and from the mobile terminals 20. This traffic may involve a user of one mobile terminal 20 communicating with another mobile terminal user, or may involve the mobile terminal user communicating with other users or systems associated with the PSTN 22 or PDN 24.

Figure 2:
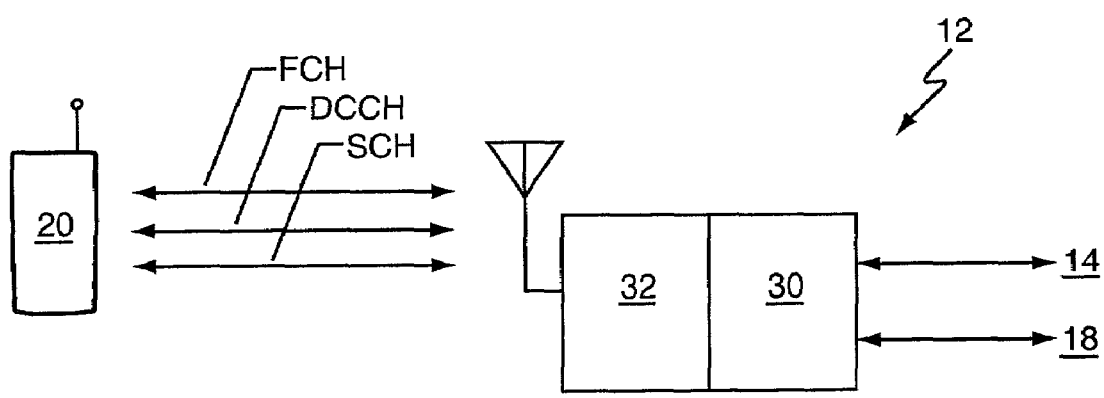
FIG. 2 is a diagram of typical RF channels allocated between a mobile terminal and the radio access network of FIG. 1.

The particular radio and network communication channels that are configured for a given mobile terminal 20 depend on the service or services required by the user of that mobile terminal 20. FIG. 2 illustrates the dedicated physical radio channels used for communications between the RAN 12 and the mobile terminal 20 in a cdma2000-based network. These channels may include a fundamental channel (FCH), a supplemental channel (SCH), and a dedicated control channel (DCCH). Forward channels carry data from the RAN 12 to the mobile terminal 20, while reverse channels carry data from the mobile terminal 20 to the RAN 12.

Fundamental channels are typically used for low data rate (e.g., 9.6 kbps) services such as voice, while the supplemental channels are used to support higher data rate services. Typically, the maximum data rate of a supplemental channel is configurable between some minimum and maximum value. For example, a typical forward SCH (F-SCH) in a cdma2000 network may support data rates from 9.6 kilobits-per-second (kbps) to 2.3 Mbps (mega-bits-per-second). If the RAN 12 is based on W-CDMA the terminology changes, as that standard does not use fundamental and supplemental channels per se, but nonetheless W-CDMA employs configurable or variable data rate radio channels.

In a typical cdma2000 scenario, a user of the mobile terminal 20 is assigned a forward FCH (F-FCH) upon initially accessing the RAN 12. If the user requires a higher data rate service, the user's mobile terminal may be assigned a F-SCH to support the higher data rate needed. In packet data calls, the F-FCH is setup during call-setup time. With higher rates of incoming communication traffic (i.e., more than supportable with F-FCH capacity), the radio link protocol (RLP) data queue used by the RAN 12 to queue outgoing communication traffic to the mobile terminal 20 will grow in length. This leads to increasing queuing delay, which beyond a given delay threshold is undesirable.

To understand the relationship between queuing delay and queue length, first consider end-to-end delay, also referred to as round trip time (RTT) of the data connection involved. In this exemplary case, the RTT may be on the order of 500 ms to one second, which equals the typical packet data Transmission Control Protocol (TCP) time out. The wireless link portion of the RTT delay varies depending upon the air interface, but may typically range from 80 to 120 ms. Also, a nominal frame error rate (FER) of roughly two-percent may be assumed for the outgoing communication traffic. With these values, the effective maximum wireless link on the F-FCH is given approximately as, $$\text{Rate} = (\text{base FCH rate})(\% \text{ of available bandwidth})(1-\text{FER}),$$

which approximately equals 9.6 kbps*0.8*0.98=7.526 kbps. Thus, the effective RLP buffer length (data queue) permissible to avoid delays in excess of a target value (e.g., 300 ms in this particular example) is given as, Maximum buffer length =7.526 kbps/8 bits/byte*0.3 seconds =282 bytes. Therefore, in this example, if the F-FCH RLP data queue for outgoing communication traffic to the mobile terminal 20 exceeds 282 bytes excessive transmission delay may occur.

It follows from this data queue length analysis that excessive packet size can violate the queue length restraint. That is, the communication traffic may comprise packet data of varying packet sizes. The size of a given packet depends on a number of variables, including its type and source. In any case, in the above example, a large data packet would violate the maximum desirable queue length, and could result in undesired transmit delay from the perspective of the mobile terminal 20.

However, the packet size limit above which supplemental channel activation is triggered may or may not be equal to the queue length limit. For example, some types of communication traffic may comprise occasional large data packets with relatively long intervening periods of no traffic. Wireless application protocol (WAP) traffic may exhibit this characteristic. As such, it would be undesirable to trigger F-SCH allocation just to service the occasional large, intermittent data packet. Thus, the trigger threshold should be configurable and may take on one of several different values that may be set based on traffic source, traffic type, or other operating condition.

Figure 3:
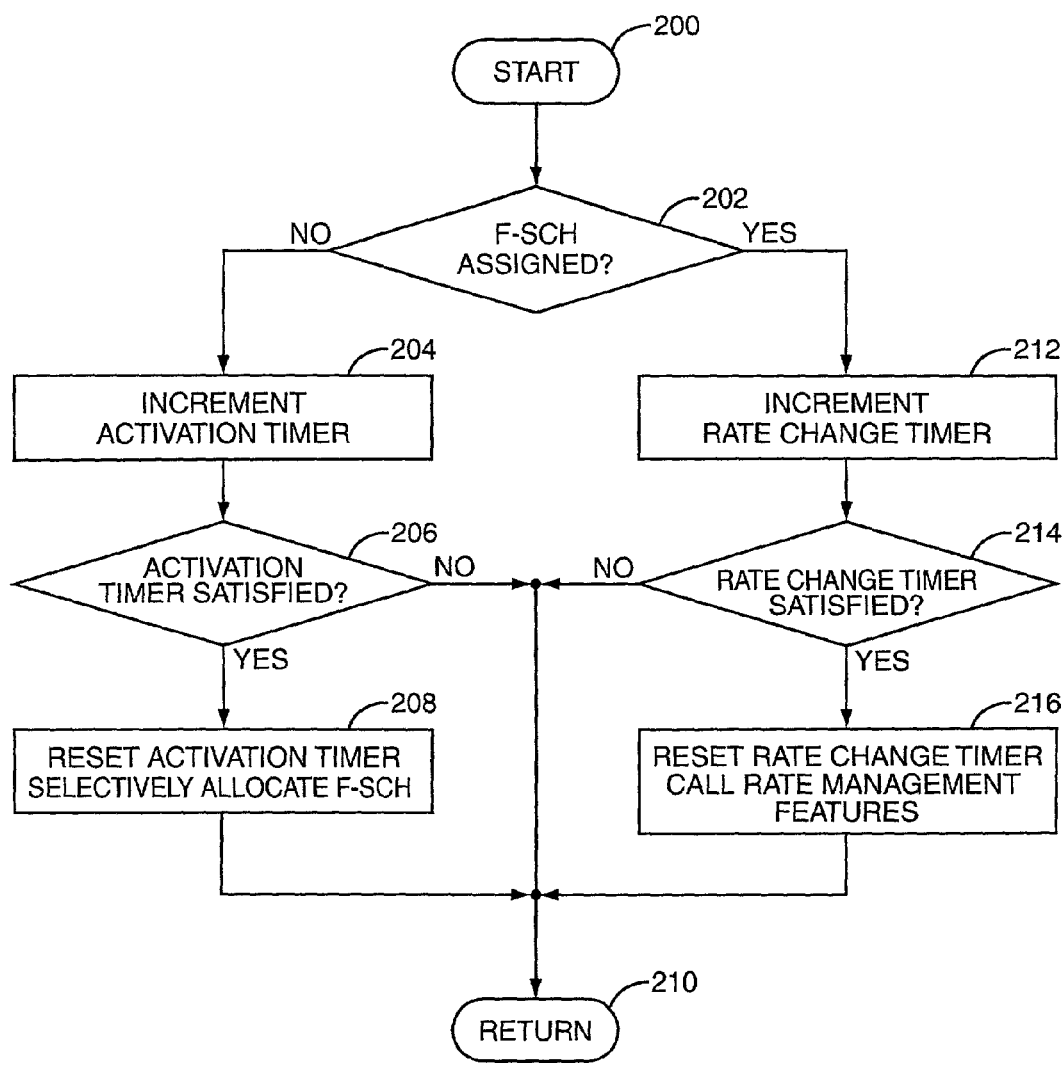
FIG. 3 is a diagram of exemplary logic for high data rate channel activation and rate management activation.

One approach to determining whether to assign a F-SCH to a given mobile terminal 20 is outlined in the logic flow of FIG. 3. In FIG. 3, processing begins (block 200) assuming that a F-FCH is already assigned to mobile terminal 20 and that some form of data rate monitoring indicates the need for radio channel capacity beyond that provided by the F-FCH. With regard to the above discussion, this may be, for example, an indication that the RLP queue length for outgoing communication traffic is excessive, or that packet size is larger than expected. If a F-SCH is not already assigned to the mobile terminal 20 (block 202), a F-SCH activation timer is incremented (block 204). If the activation timer has reached a configurable, predetermined value (block 206), it is reset and procedures to selectively allocate a F-SCH to address the needed data rate increases are called (block 208). Exemplary details regarding F-SCH activation appear later in FIG. 4.

If the activation timer has not reached the predetermined value (block 206), processing ends (block 210). These processing steps may be called with a frequency dependent on the desired maximum transmit delay time. Thus, the logic of FIG. 3 may be executed every 60 ms for example. With that value, the activation timer would reach its threshold value after n*60 ms, where "n" is the configurable threshold count value.

If a F-SCH is already active for the mobile terminal 20 (block 202), then rate management techniques may be used to maintain an optimal or best matching data rate capacity configuration for the assigned F-SCH resources. Such rate management functions should be called periodically during active service, so a rate change timer is incremented each time the logic of FIG. 3 is called with an active F-SCH (block 212). Again, an exemplary calling interval might be 60 ms, or other appropriately selected period. If the change timer reaches a predetermined count value "m" (block 214), a rate management routine is called and the rate change timer is reset (block 216). Rate management features are detailed later herein. Upon completion of rate management operations or if the rate change timer has not reached its threshold count, processing ends (block 210).

Figure 4:
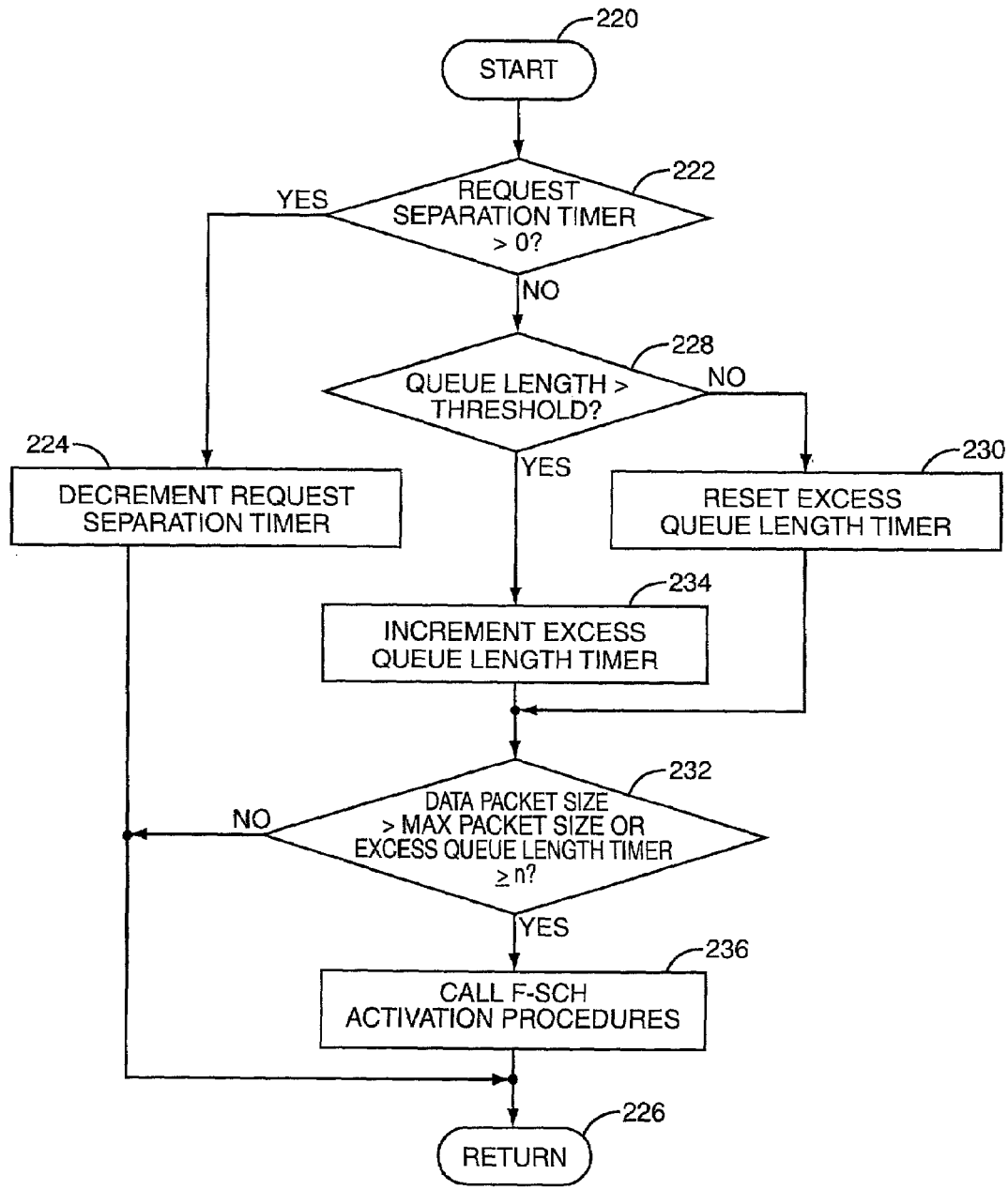
FIG. 4 is a more detailed diagram of exemplary logic for high data rate channel activation.

FIG. 4 provides exemplary flow logic for the F-SCH activation operations described above and shown in FIG. 3 (block 208). Processing begins (block 220) with a determination of whether F-SCH activation has been previously requested in association with the current mobile terminal communications session (e.g., the same call) (block 222). A request separation timer is used to prevent activation operations from requesting additional radio channel allocations (i.e., a new F-SCH assignment) too frequently. Without some mechanism to enforce a delay between requests, the channel activation process might repeatedly issue allocation requests, which must be processed at higher network layers, such as within the signaling layer, and could place significant, unproductive processing burden on the BSC 30.

If the request separation timer has a non-zero value, meaning that a prior channel activation request was issued that resulted in no F-SCH channel allocation, presumably due to a lack of available resources, the request separation timer is decremented (block 224) and processing ends (block 226). The activation routine will follow this logical flow through subsequent calls to it until the request separation timer has been decremented to zero, thus enforcing the desired delay between channel activation requests sent to the signaling layer. One second represents an exemplary value for the request separation timer, and with this value repeated requests for SCH activation would be at least one second apart, thereby minimizing processing overhead in the RAN 12.

If the request separation timer is already zero, then one or more F-SCH activation "triggers" are evaluated. In this exemplary logic flow, the first trigger condition evaluated is the length of the RLP data queue for the outgoing communication traffic to the mobile terminal 20 (block 228). If the outgoing packet data has an excessive queue length, this is an indication that the F-FCH is inadequate to serve the mobile terminal's service needs. Simply put, the queue length of outgoing data is an effective indicator as to whether the data rate of the F-FCH is sufficient to keep up with the incoming data rate of traffic for the mobile terminal 20. Here, "incoming" refers to traffic coming into the RAN 12 for transmission to the mobile terminal 20.

If the RLP data queue length does not exceed a defined threshold (e.g., a maximum permissible queue length), an excess queue length timer is reset (block 230), and the next trigger condition is evaluated. The next trigger is based on the size of one or more packets in the outgoing communication traffic. For example, if one or more packets have a packet size that exceeds the maximum permissible packet size, then activation of the F-SCH may be warranted to avoid excessive transmission delay to the mobile terminal 20 (block 232).

If the current RLP data queue length exceeds maximum permissible queue length value (block 228), the excess queue length timer is incremented (block 234). An excess queue length timer at or above a defined threshold count indicates that the RLP data queue has exceeded its maximum permissible length for a defined period of time and, therefore, activation of the F-SCH is warranted (block 232). Note that the interval between calling the processing logic of FIG. 4 will determine the amount of time represented by each increment of the excess queue length timer, with a value of 60 ms representing a nominal time period. Using the timer insures that the excess queue length trigger is based on a continuing condition rather than on a temporary increase in RLP data queue length. If either the excess RLP data queue length or excess packet size trigger conditions are satisfied (block 232), processing continues with F-SCH activation (block 236).

A number of steps occur with regard to the F-SCH activation request. First, an activation request rate value ($Req_{13}$ Rate) is set to the desired data rate capacity indicator. The requested rate may default to, for example, the maximum defined data rate, or may be based on some intermediate value that reflects a rate that is satisfactory for most general high data rate traffic. Alternatively, the requested rate may be based on a custom value that is linked to subscriber-specific information. For example, the user of the mobile terminal 20 may have relevant subscriber profile information in the HLR 16 (or elsewhere) that determines the default data rate. This subscriber information may indicate, for example, whether the subscriber is eligible for premium data rate services, or may otherwise have a default data rate value that may be used in requesting the F-SCH.

An activation procedure is called using the $Req_{13}$ Rate value that involves communicating with other processes in the BSC 30 where the resource assignments are made, such as communicating with the signaling layer. If the requested assignment is granted, the assigning process communicates back an $Assigned_{13}$ Rate value that may or may not equal the $Req_{13}$ Rate value. An $Initial_{13}$ Rate value is set equal to the $Assigned_{13}$ Rate so that in indicator of the beginning data rate for the assigned F-SCH may be preserved. An $FSCH_{13}$ Active flag may then be set to indicate that F-SCH resources are active for the mobile 20, and an adjustment guard timer ($Guard_{13}$ Timer) may be initialized with an appropriate count value. The $Guard_{13}$ Timer is described later in the discussion of rate management operations. After completion of these operations, processing ends (block 226).

Note that if the BSC 30 indicates that no additional resources are available for completing the requested radio channel allocation, the request separation timer may be reset to an appropriate count value (block 236). As explained, subsequent calls to the logic flow of FIG. 4 will then decrement that timer, thus separating repeated resource requests by an appropriate delay to limit system processing overhead.

While the above discussion of F-SCH activation triggering related primarily to the cdma2000 scenario where an initial F-FCH is supplemented with a F-SCH if needed, it alluded to rate management processing once the F-SCH channel was allocated. One advantage of rate management is that it allows the RAN 12 to avoid under- or over-allocating radio resources. That is, the data rate capacity allocated to individual mobile terminals 20 should ideally match the actual data rate requirements of those mobile terminals 20.

While exact data rate matching may not be practicable since rates may be selectable only in discrete steps and user traffic is very bursty, it is still preferable to assign the most appropriate data rate capacity to each user. It should be noted that data rate management as described herein is not limited to cdma2000, or to W-CDMA. Data rate management as described herein is appropriate for wireless communication systems where multiple data rates are defined and radio resource allocation may be optimized by matching allocated radio channel rate capacity based on actual channel usage.

In general, an allocated radio channel is rate managed based on monitored channel usage or monitored error. This applies whether the channel in question is a F-SCH in a cdma2000 system, a configurable-rate radio channel, such as a digital traffic channel (DTCH), in a W-CDMA system, or other configurable rate channel in another type of communication system.

Channel usage and channel errors are generally good bases for rate management functions. In a cdma2000 implementation, the RAN 12 (e.g., BSC 30) may monitor RLP usage and RLP FER. Other network types may use different terminology for like parameters. Thus, if RLP usage is above a configurable upper usage threshold, it may be appropriate to re-configure the allocated radio channel to provide a higher data rate capacity to the mobile terminal 20. Conversely, if RLP usage is below a configurable lower threshold, it may be appropriate to re-configure the allocated radio channel to provide a lower data rate capacity, or perhaps even de-allocate the radio channel.

RLP usage (or its comparable metric) may be measured in exemplary fashion as follows, $$RLP_{13}\ Usage=(X*100)/(D*RATE),$$

where X= total number of octets sent as new data to the mobile terminal 20, D=number of frame durations since last usage measurement, and RATE=a value based on the current channel data rate. Essentially, $RLP_{13}$ Usage serves as an indicator of the percentage of RLP frames used to send new data to the mobile terminal 20.

As with usage, the capacity (i.e., data rate) of the allocated radio channel may be adjusted upwards or downwards based on observed communication error, which may be indicated by RLP FER for example. A high FER indicates a potentially bad radio link with the mobile terminal 20 and suggests that forward link power levels are not sufficient to sustain communications at the current date rate.

RLP error (or its comparable metric) may be measured in exemplary fashion as follows, $$RLP_{13}\ Error=(E*100)/(D*RATE),$$

where E=total number of retransmitted octets. Essentially, $RLP_{13}$ Error serves as an indicator of the percentage of RLP frames being used to retransmit data to the mobile terminal 20.

Using these usage and error parameters, rate management processing may adjust the capacity of allocated radio channels as needed. The frequency at which rate changes are made may be adjusted in accordance with particular system needs. For example, in a system with a relatively slow forward-link power control loop, it may be desirable to slow down rate adjustments such that rate change adjustments do not outpace the frequency with which forward link power adjustments are made. Such a scenario might be found in, for example, a wireless local loop (WLL) implementation of the RAN 12, where mobility is typically not an issue and power control is typically implemented with a much slower control bandwidth as compared to a conventional high-mobility cellular communications implementation of the RAN 12.

Figure 5:
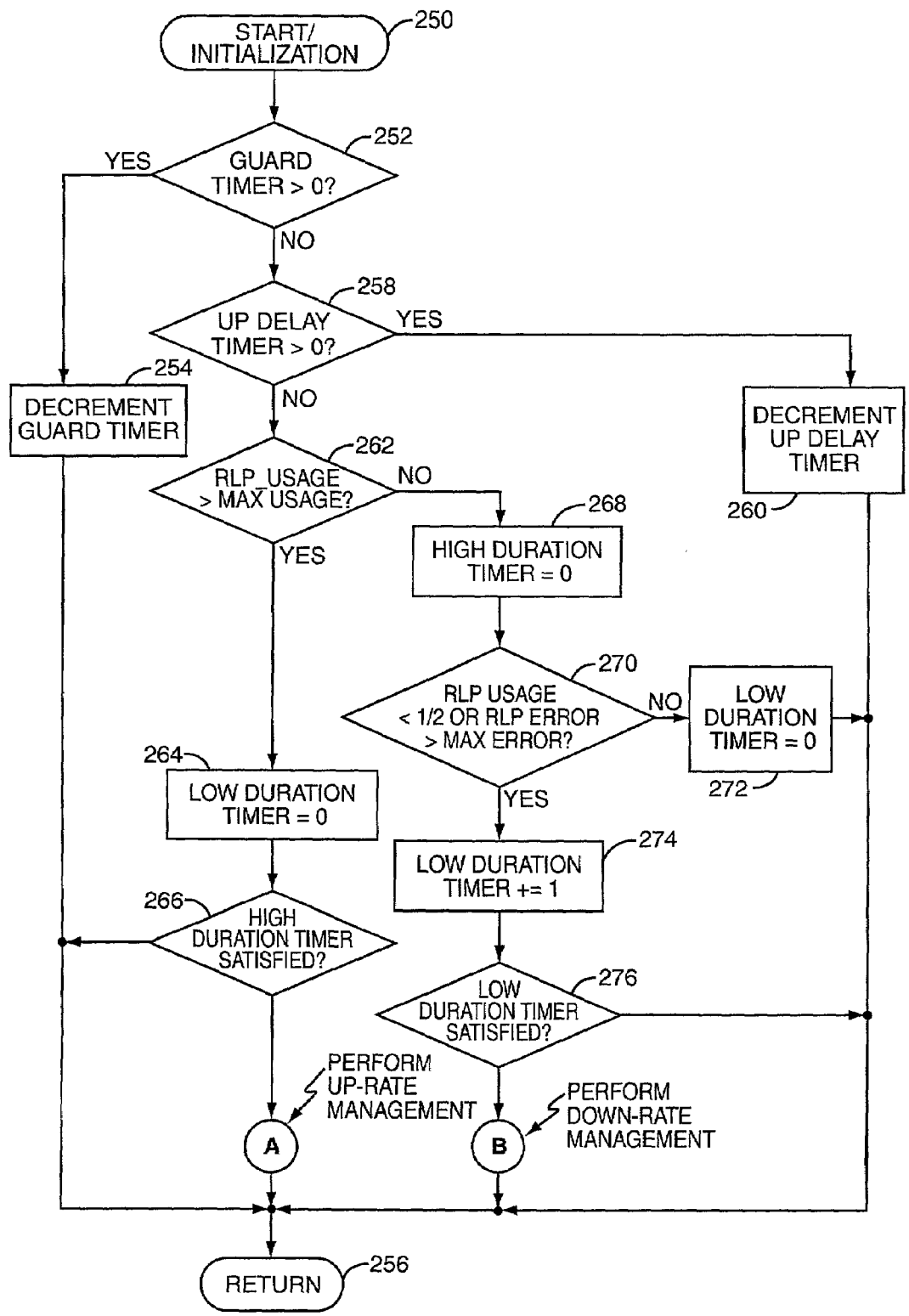
FIG. 5 is a more detailed diagram of exemplary logic for radio channel data rate management.

FIG. 5 illustrates exemplary logic for a rate management function. The rate management function determines whether to increase, decrease, or maintain a current data rate for a radio channel allocated to the mobile terminal 20. Typically, a higher-level program or other controlling function calls the rate management function on a periodic basis. In an exemplary implementation with a data frame rate of 20 ms, the rate management function may be called every six frames or every 120 ms.

Upon being called, rate management processing begins (block 250) with a first or one-time initialization of various timers and constants as needed. Here, High and Low Duration Timers are initialized to zero. As the rate management function is called on a periodic basis, the duration of the calling interval determines High and Low Duration Timer values. That is, if the rate management function is called once per N frame cycles (i.e., once per N data frames), each count value of the High and Low Timers represents N frame times. With the exemplary value of six (6) for N, each count value of the Low and High Duration Timers equates to 120 ms for 20 ms frame times.

Processing continues with evaluation of the Guard Timer (block 252). The Guard Timer prevents the rate management function from making rate adjustments too frequently. That is, after each rate adjustment, it is reset to a default non-zero count and must decrement down to zero again before a subsequent rate change is permitted. If the Guard Timer is not clear (i.e., non-zero), it is decremented (block 254) and processing ends (block 256). Note that here, as in the other logic flow illustrations, "RETURN" indicates a return to other processing, which most likely entails a return to the calling program for execution of other tasks.

If the Guard Timer is clear (i.e., zero). Processing continues with evaluation of the Up Delay Timer (block 258), which operates on a similar basis, but may have a different non-zero default or reset count value than the Guard Timer. The Up Delay Timer prevents a too rapid rate increase following a rate decrease operation and will be explained in more detail later.

If the Up Delay Timer is not clear (i.e., non-zero), it is decremented (block 260) and rate management processing ends (block 256) until the next time it is called. If the Up Delay Timer is clear, processing continues with an evaluation of the channel usage (block 262). An exemplary channel usage evaluation compares the $RLP_{13}$ Usage value with a $MAX_{13}$ USAGE constant, which may be a configurable percentage utilization threshold. The calculation of $RLP_{13}$ Usage was described earlier, and it was explained that it indicated a percent utilization of the allocated radio channel as determined in the time between calls to the rate management function.

If channel utilization is greater than $MAX_{13}$ USAGE, the High Duration Timer is incremented and the Low Duration Timer is set to zero (block 264). If the High Duration Timer is satisfied, meaning it has reached a predetermined count value (block 266), up-rate management operations are performed at "A," which are detailed in FIG. 6, and processing ends (block 256). Use of the High Duration Timer, which is incremented each time the rate management function is called if channel usage ($RLP_{13}$ Usage) is above the $MAX_{13}$ USAGE threshold, serves to qualify the high usage condition. That is, if the high usage condition has persisted over a sufficient number of calling intervals to the rate management function, increasing the data rate capacity to the mobile terminal 20 is warranted. Up-rate management operations are identified as "A" in FIG. 5, and detailed in FIG. 6. An interval count of three is an exemplary value for the High Duration Timer count threshold, based on a maximum 60 ms frame timing.

If channel utilization is not greater than $MAX_{13}$ USAGE (block 262), the High Duration Timer is set to zero (block 268). Processing continues with an evaluation of whether the current usage ($RLP_{13}$ Usage) is less than a usage limit for halving, or whether the channel errors ($RLP_{13}$ Error) exceed a defined error threshold denoted as $MAX_{13}$ ERROR (block 270). The usage limit for halving may be set depending on the type of RAN 12, but is generally defined as a minimum percentage of channel utilization below which a current data rate capacity should not be maintained.

Similarly, $MAX_{13}$ ERROR may be an FER threshold above which it makes sense to reduce the data rate to the mobile terminal 20. In other words, if the radio link conditions to the mobile terminal 20 are so bad that substantial errors occur at the current data rate, the allocated channel resources are not being efficiently used. In this sense, evaluation of channel utilization entails both the calculated percentage utilization, as well as the effectiveness of that utilization based on observed or measured error.

If neither the usage limit for halving nor the $MAX_{13}$ ERROR thresholds are violated, the Low Duration Timer is cleared to zero (block 272) and processing ends (block 256). However, if one or both thresholds are violated, the Low Duration Timer is incremented (block 274) and then evaluated to determine if the under-utilization condition has persisted long enough to warrant a down-rate adjustment (block 276). This condition is evaluated by determining whether the Low Duration Timer has reached a predetermined count threshold. If it has not, processing ends (block 256). If the Lower Duration Timer has reached the count threshold (e.g., a count of three), processing continues with down-rate management operations at "B," which are detailed in FIG. 7.

Figure 6:
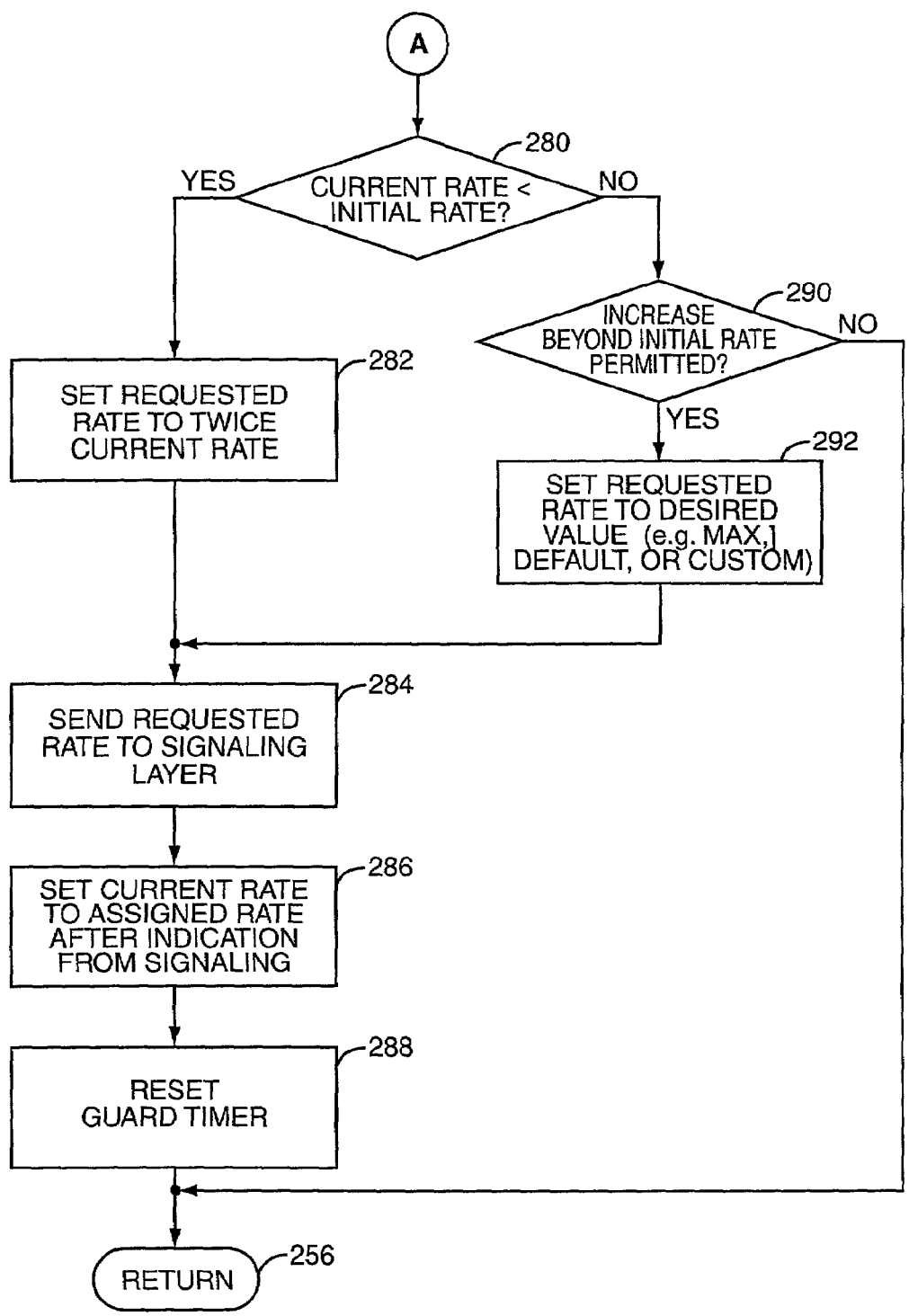
FIG. 6 is an exemplary diagram for the up-rate management operations shown in FIG. 5.

In FIG. 6, the up-rate operations identified as "A" in FIG. 5 begin with an evaluation of whether the current data rate is less than the data rate of the radio channel in question when it was initially assigned to the mobile terminal 20 (block 280). If so, a requested rate parameter denoted as $REQ_{13}$ RATE is set to reflect a desired increase from the current data rate. In this example, $REQ_{13}$ RATE is set to twice the current rate (block 282).

A request for a rate increase is then sent to the appropriate handler in the RAN 12 (e.g., the signaling layer functions in the BSC 30) using the $REQ_{13}$ RATE value to indicate the new rate desired (block 284). The signaling layer will allocate resources as available and return a value indicating the assigned rate, which may or may not match the requested rate.

To preserve the rate actually assigned, this value is saved as the new current rate, denoted by $CURRENT_{13}$ RATE (block 286). Note that this logic flow assumes that resources to support a higher rate are available. However, the BSC 30 may not be able to assign any higher rate and it should be understood that the logic of FIG. 6 implicitly accounts for this underlying possibility. Also, note that in some communication network types, increasing the data rate capacity may comprise assigning a new radio channel in addition to the currently assigned radio channel. As an example, an IS-2000 network may add supplemental channels (SCHS) as needed to accommodate the required data rate. In any case, processing continues with resetting the Guard Timer (block 256), to enforce a delay before any subsequent rate changes are made by the rate management function.

If the current rate is not less than the initial rate (block 280), processing continues with an optional evaluation of whether it is permissible to increase the rate beyond that which was initially allocated (block 290). If such an increase is not permitted, processing ends (block 256). However, if the increase is permissible, the $REQ_{13}$ RATE parameter is set to the desired rate value (block 292). The desired rate may be a multiple of the current rate, may be a default maximum value, or may be a custom value linked to, for example, subscriber-specific information. In this latter case, subscriber profile information, such as might be stored in the HLR 16, may be used to determine the value for $REQ_{13}$ RATE. After setting the $REQ_{13}$ RATE value, processing continues as above with the rate management function sending the rate request to the signaling layer and responding the assigned rate (blocks 284–288).

Allowing the current rate to progress above the initially assigned rate may have differing implications depending upon the type of RAN 12 involved. For example, in a cdma2000 system, the Walsh code assignments and the particular radio resources assigned to a given radio channel are based on the channel's data rate. To move beyond this initial rate may require assigning a new radio channel, which requires tearing down the existing channel and setting up the new channel. Moreover, there may be a period of overlapping teardown and setup where resources from both the old channel and new channel are dedicated to the mobile terminal 20. Thus, some care should be exercised in these operations, given the call processing overhead and resource utilization considerations involved.

With these considerations, it may be desirable to use custom subscriber information to determine whether a higher-than-initial data rate increase is permitted. The subscriber may be charged a premium for such flexibility, or may forego additional service charges at his or her option. Incorporating subscriber preferences into the rate management function allows service providers to provide pricing and service flexibility to subscribers.

Figure 7:
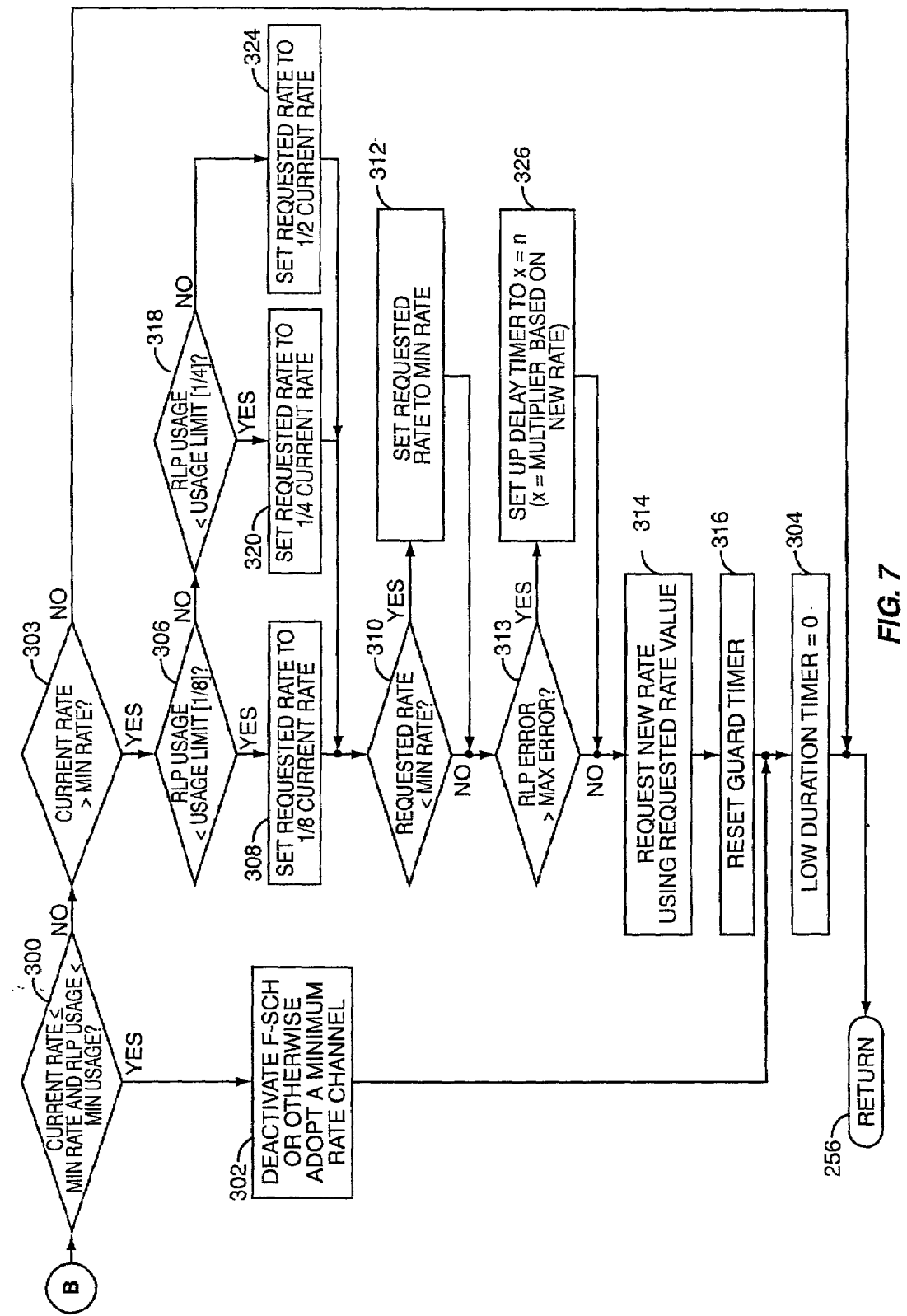
FIG. 7 is an exemplary diagram for the down-rate management operations shown in FIG. 5.

The remaining operations of the exemplary rate management function address down-rate management shown in FIG. 5 as "B" and are illustrated in FIG. 7. Processing begins with an evaluation of whether the current rate ($CURRENT_{13}$ RATE) is less than or equal to the min rate, which is denoted as $MIN_{13}$ RATE, and whether current usage is less than or equal to the minimum usage threshold $MIN_{13}$ USAGE, described earlier (block 300). Here, $MIN_{13}$ RATE may be a value dependent on the type of RAN 12 involved, such as the minimum defined F-SCH data rate in a cdma2000 system, or the next-to-lowest data rate defined for W-CDMA for example.

If the current rate is not greater than the minimum rate (block 303), processing continues with no adjustment (block 256). If at or below $MIN_{13}$ RATE and at or below $MIN_{13}$ USAGE, the higher data rate channel is deactivated, or a lower data rate channel is otherwise adopted (block 302). In cdma2000, this might entail de-allocating the F-SCH, relying only on the F-FCH. In W-CDMA, this might entail dropping back to the lowest defined data rate for the allocated channel. Once the channel is de-allocated or a minimum rate channel is adopted, processing continues with the Low Duration Timer being cleared to zero (block 304), after which processing ends (block 256).

If either of the above conditions is not met, and if the current rate is greater than the minimum rate, processing continues with additional evaluation of the channel usage (block 306). A defined table of usage values may be stored in a memory comprising a portion of the BSC 30 or elsewhere, such that it is accessible to the rate management function. This table, denoted as $Usage_{13}$ Limit[ ], comprises a set of thresholds corresponding to convenient fractional channel utilizations. For example, $Usage_{13}$ Limit[ ] may comprise the following values:

TABLE 1

Usage_Limit Data Structure

| | |
|---|---|
| Usage_Limit[⅛] | ⅛ Utilization Threshold |
| Usage_Limit[¼] | ¼ Utilization Threshold |
| Usage_Limit[½] | ½ Utilization Threshold |

Of course, the definitions and thresholds in the above table may be varied as needed.

The first evaluation determines whether the channel usage (e.g., $RLP_{13}$ Usage) is below the $Usage_{13}$ Limit[⅛] threshold. If so, the $REQ_{13}$ RATE value is set to ⅛ the $CURRENT_{13}$ RATE value (block 308). This $REQ_{13}$ RATE value is checked to insure that is not below the minimum defined rate (block 310). If it is, the $REQ_{13}$ RATE is set to the minimum defined rate $MIN_{13}$ RATE (block 312) and processing continues. The current error level (e.g., $RLP_{13}$ Error) is evaluated to determine whether it exceeds the $MAX_{13}$ ERROR threshold (block 313). If the error threshold is exceeded, the Up Delay Timer is then set to enforce a delay that prevents subsequent calls to the rate management function from making upward rate adjustments too soon (block 326).

From there, processing continues with a request to the signaling layer to adjust the current rate to the newly requested reduced rate (block 314) and the Guard Timer is reset to enforce a delay before subsequent adjustments are made (block 316). Because reducing the current data rate addresses the low duration condition that prompted the rate fallback, the Low Duration Timer is reset to zero (block 304).

If the initial channel usage evaluation above determines that RLP usage was above the ⅛ threshold (block 306), processing continues with an evaluation of whether usage is below the ¼ threshold (block 318). If so, the rate to be requested is set to ¼ the current rate (block 320) and processing continues as above (e.g., from block 310). If the usage equals or exceeds the ¼ threshold, the requested rate is set to ½ the current rate (block 324), and processing continues as above (e.g., from block 310).

If the condition necessitating downward rate adjustment was excessive error rather than underutilization of the channel, there is substantial value in imposing a controlled delay using the Up Delay Timer before any subsequent up-rate adjustments are allowed. That is, it is likely that if the radio environment surrounding the mobile terminal 20 was bad enough to result in the FER exceeding the $MAX_{13}$ ERROR threshold, there will likely be little gained by bumping the data rate back up soon after a downward adjustment.

Whether a downward rate adjustment is due to error or underutilization, it may also be advantageous to set the Up Delay Timer in consideration of the new rate. For example, if the new rate is at or near the highest defined data rate, it may be sensible to enforce a relatively long delay before allowing subsequent up-rate adjustments. Conversely, if the new rate is near the minimum data rate, it may be sensible to impose a less lengthy delay before allowing subsequent up-rate adjustments. This logic acknowledges the increasing likelihood of failure in attempts to increase the data rate of a connection with an already high data rate.

Exemplary values for the Up Delay Timer in a cdma2000 environment are given in the following table:

TABLE 2

Exemplary Up Delay Timer Settings

| | |
|---|---|
| New Rate = 16x (max rate setting) | Timer value = 16 * 8 |
| New Rate = 8x | Timer value = 8 * 8 |
| New Rate = 4x | Timer value = 4 * 8 |

"x" denotes base data rate

Of course, the up-rate delays are preferably configurable to accommodate the varying needs of different implementations and RAN types.

It should be understood that the preceding logic flows illustrated in FIGS. 4–7 are exemplary. The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of managing a radio channel assigned to a mobile terminal in a radio access network that supports a plurality of radio channel data rate capacities, the method comprising:

monitoring usage of the radio channel over an interval of time;

increasing a data rate capacity of the radio channel if the usage remains above a maximum usage threshold for a first qualified period of time by:

selecting a desired data rate capacity above a data rate capacity of the radio channel as indicated by a current rate value if the usage remains above a maximum usage threshold for a first qualified period of time, requesting that the radio channel be configured for the desired data rate capacity, receiving information bearing on an assigned data rate capacity if the request was granted, and updating the current rate value to reflect the assigned data rate capacity; and decreasing the data rate capacity of the radio channel if the usage remains below a minimum usage threshold for a second qualified period of time.

2. The method of claim 1 further comprising:
initiating a guard timer after each increase or decrease of the data rate capacity of the radio channel; and
suspending subsequent increases or decreases of the data rate capacity of the radio channel irrespective of the usage of the radio channel until the guard timer reaches a predetermined time-out value.

3. The method of claim 1 further comprising:
monitoring an error rate associated with the radio channel; and
decreasing the data rate capacity of the radio channel if the error rate exceeds a maximum error rate threshold.

4. The method of claim 3 wherein monitoring an error rate associated with the radio channel comprises monitoring a frame error rate (FER) for communication traffic carried by the radio channel.

5. The method of claim 3 wherein monitoring an error rate associated with the radio channel comprises determining the error rate as a percent error over a defined interval of time by:
determining an amount of data sent over the radio channel for the defined interval of time that had to be re-transmitted; and
computing the percent error using a first value representing the amount of re-transmitted data and a second value representing a maximum amount of data that could have been sent over the radio channel over the same interval of time at a current data rate capacity of the radio channel.

6. The method of claim 1 wherein monitoring usage of the radio channel over an interval of time comprises determining the usage as a percentage utilization at a current data rate capacity of the radio channel by:
determining an amount of new data sent over the radio channel over the interval of time; and
computing the percentage utilization using a first value representing the amount of new data and a second value representing a maximum amount of data that could have been sent over the radio channel over the same interval of time at the current data rate capacity of the radio channel.

7. The method of claim 6 wherein the interval of time comprises one or more transmission frame times of the radio access network, and wherein determining an amount of new data sent over the radio channel over the interval of time comprises determining a total number of new data octets sent over of the radio channel during the interval of time.

8. The method of claim 1 further comprising:
initiating an up-delay timer after certain decreases of the data rate capacity of the radio channel; and
suspending subsequent increases of the data rate capacity of the radio channel irrespective of the usage of the radio channel until the up-delay timer reaches a predetermined time-out value.

9. The method of claim 8 wherein initiating an up-delay timer after certain decreases of the data rate capacity of the radio channel comprises:
determining if an up-delay trigger criteria is satisfied by determining if the usage of the radio channel falls within a range of about one-half the maximum usage threshold up to the maximum usage threshold; and
initiating the up-delay timer if the up-delay trigger criteria is satisfied.

10. The method of claim 1 further comprising:
determining whether it is permissible to increase the data rate capacity of the radio channel beyond an initially allocated data rate capacity; and
performing the steps of selecting, requesting, receiving, and updating only if it is permissible to increase the data rate capacity of the radio channel beyond the initially allocated data rate capacity.

11. The method of claim 10 wherein determining whether it is permissible to increase the data rate capacity of the radio channel beyond an initially allocated data rate capacity comprises accessing subscriber-specific information bearing on a subscriber associated with the mobile terminal to which the radio channel is assigned.

12. The method of claim 10 wherein determining whether it is permissible to increase the data rate capacity of the radio channel beyond an initially allocated data rate capacity comprises accessing system configuration information that indicates whether the increase is permissible.

13. The method of claim 1 wherein requesting that the radio channel be configured for the desired data rate capacity comprises sending a request to an associated process in the radio access network that controls radio channel allocation and configuration.

14. The method of claim 1 wherein decreasing the data rate capacity of the radio channel if the usage remains below a minimum usage threshold for a second qualified period of time comprises:
comparing a usage of the radio channel to fractional thresholds of the minimum usage threshold;
selecting the desired data rate capacity based on between which of the fractional thresholds the usage lies;
requesting that the radio channel be configured for the desired data rate capacity;
receiving information bearing on the assigned data rate capacity if the request was granted; and
updating the current rate value to reflect the assigned data rate capacity.

15. The method of claim 1 further comprising:
decreasing the data rate capacity of the radio channel if an error measurement for the radio channel exceeds a maximum error threshold;
setting an up-delay timer to a desired expiration period; and
suspending subsequent increases in the data rate capacity of the radio channel irrespective of channel usage until the up-delay timer expires.

16. The method of claim 15 further comprising configuring the expiration period of the up-delay timer based on a current data rate capacity of the radio channel with respect to a maximum data rate capacity as defined by the radio access network.

17. The method of claim 1 wherein the radio access network is an IS-2000 based network, and wherein monitoring usage of the radio channel over an interval of time comprises:
monitoring Radio Link Protocol (RLP) usage over an interval of one or more transmission frames; and
determining an amount of new RLP data sent during the interval.

18. The method of claim 17 wherein the radio channel is a supplemental channel in the IS-2000 based network and requesting that the radio channel be configured for the desired data rate capacity comprises issuing a request for a base station controller within the IS-2000 based network that is managing the radio channel to increase the data rate capacity of the supplemental channel to a higher one of a defined number of data rate settings.

19. The method of claim 17 wherein the radio channel is a supplemental channel in the IS-2000 based network and further comprising de-allocating the supplemental channel if the usage of the radio channel is below the minimum usage threshold and a current data rate capacity of the supplemental channel is a lowest defined data rate capacity.

20. The method of claim 1 further comprising de-allocating the radio channel if the usage is below the minimum usage threshold and a current data rate capacity of the radio channel is at a minimum data rate capacity as defined for the radio access network.

21. The method of claim 1 wherein the radio access network is an IS-2000 based network and the radio channel is a supplemental channel, and further comprising:
 before initial allocation of the supplemental channel to the mobile terminal, determining whether a fundamental channel that is allocated to the mobile terminal has a sufficient data rate capacity; and
 allocating the supplemental channel to the mobile terminal if the data rate capacity of the fundamental channel is not sufficient.

22. The method of claim 21 further comprising selecting an initial data rate capacity of the allocated supplemental channel based on subscriber-specific information associated with the mobile terminal.

23. The method of claim 21 wherein determining whether a fundamental channel that is allocated to the mobile terminal has a sufficient data rate capacity comprises monitoring a data queue length used to queue communication traffic sent over the fundamental channel to determine whether a defined maximum data queue length is exceeded.

24. The method of claim 21 wherein determining whether a fundamental channel that is allocated to the mobile terminal has a sufficient data rate capacity comprises monitoring packet data size for communication traffic sent over the fundamental channel to determine if a defined maximum packet data size is exceeded.

25. The method of claim 1 wherein updating the current rate value to reflect the assigned data rate capacity comprises assigning a new radio channel to increase a data rate capacity to the mobile terminal.

26. A method of data rate management in a radio access network capable of adjusting radio channel data rate capacity, the method comprising:
 monitoring channel utilization for a radio channel carrying communication traffic to a mobile terminal;
 increasing a data rate capacity for said radio channel if channel utilization exceeds a first utilization threshold and if an increase in the data rate capacity is permissible;
 decreasing the data rate capacity for said radio channel if channel utilization is below a second utilization threshold and if a decrease in the data rate capacity is permissible;
 starting a high duration timer to time a period of time that said channel utilization exceeds said first utilization threshold; and
 deferring any action to increase said data rate capacity until said high duration timer reaches a predetermined high condition count.

27. The method of claim 26 further comprising:
 monitoring an error term associated with said radio channel; and
 decreasing the data rate capacity for said radio channel if said error term exceeds a first defined error threshold and if a decrease in data rate is permitted.

28. The method of claim 26 further comprising:
 initiating a first timer upon each increase or decrease of the data rate capacity for said radio channel; and
 suspending subsequent increases or decreases of the data rate capacity for said radio channel until expiration of said first timer.

29. The method of claim 26 further comprising:
 incrementing a count value of said high duration timer on a periodic basis; and
 evaluating whether an accumulated count value of said high duration timer has reached said predetermined high condition count to determine whether a subsequent data rate capacity adjustment is permitted.

30. The method of claim 26 further comprising:
 starting a low duration timer to time a period of time that said channel utilization remains below said second utilization threshold; and
 deferring any action to decrease said data rate capacity until said low duration timer reaches a predetermined low condition count.

31. The method of claim 30 further comprising:
 incrementing a count value of said low duration timer on a periodic basis; and
 evaluating whether an accumulated count value of said high duration timer has reached said predetermined low condition count to determine whether a subsequent data rate capacity adjustment is permitted.

32. A computer readable media comprising software for instructing a processing system in a radio access network to:
 monitor usage of a radio channel assigned to a mobile terminal supported by the radio access network;
 increase a data rate capacity of the radio channel if the usage exceeds a maximum usage threshold for a defined interval of time;
 decrease the data rate capacity of the radio channel if the usage remains below a minimum usage threshold for a defined interval of time and;
 determine the usage as a percentage utilization value based on comparing an actual amount of new communication traffic sent over the radio channel over the defined interval of time versus a maximum amount of communication traffic that could have been sent if the radio channel was fully utilized.

33. The computer readable media of claim 32 for further instructing the processing system to de-allocate the radio channel if the usage falls below the minimum usage threshold and if a current data rate capacity of the radio channel is at a minimum defined value.

34. The computer readable media of claim 32 for further instructing the processing system to:
 determine an error rate for communication traffic sent over the radio channel; and
 decrease the data rate capacity of the radio channel if the error rate exceeds a maximum error rate threshold.

35. The computer readable media of claim 34 for further instructing the processing system to determine the error rate for communication traffic sent over the radio channel as a percentage error rate by comparing an amount of communication traffic re-transmitted over the defined interval of time against a maximum amount of communication traffic that could have been transmitted at a current data rate of the radio channel over the defined interval of time.

36. The computer readable media of claim 32 for further instructing the processing system to:
- initiate a guard timer each time the data rate capacity of the radio channel is increased or decreased; and
- suspend subsequent increases of decreases of the data rate capacity until expiration of the guard timer.

37. The computer readable media of claim 32 for further instructing the processing system to:
- selectively initiate an up-delay timer upon decreasing the data rate capacity of the radio channel; and
- suspend subsequent increases of the data rate capacity of the radio channel until expiration of the up-delay timer.

38. The computer readable media of claim 37 for further instructing the processing system to set an expiration period of the up-delay timer in proportion to a current data rate capacity of the radio channel such that the expiration period is longer for higher data rate capacities of the radio channel.

39. A base station controller system in a radio access network comprising a processing system operative to:
- allocate a radio channel to a mobile terminal, wherein the radio channel is configured with an initial data rate capacity;
- monitor usage of the radio channel based on an amount of communication traffic sent over the radio channel over a defined interval of time;
- increase a current data rate capacity of the radio channel if the usage is above a defined maximum usage threshold;
- decrease the current data rate capacity of the radio channel if the usage is below a defined minimum usage; and
- de-allocate the radio channel if the current data rate capacity of the radio channel is at a minimum and the usage is below the defined minimum usage threshold.

40. The base station controller system of claim 39 wherein the processing system is further operative to limit data rate capacity increases of the radio channel based on subscriber-specific information associated with the mobile terminal to which the radio channel is allocated.

41. The base station controller system of claim 39 wherein the processing system is further operative to:
- maintain a guard timer that is activated each time the current data rate capacity of the radio channel is increased or decreased; and
- defer subsequent data rate capacity increases or decreases of the radio channel until expiration of the guard timer to prevent excessive adjustments of the data rate capacity.

42. The base station controller system of claim 39 wherein the base station controller system is a cdma2000-based system and the radio channel is a supplemental radio channel, and wherein the processing system is further operative to:
- allocate a fundamental radio channel to the mobile terminal before allocating the supplemental radio channel; and
- determine whether to allocate the supplemental radio channel based on utilization of the fundamental radio channel.

43. The base station controller system of claim 42 wherein the processing system is further operative to determine an initial data rate capacity of the supplemental radio channel based on subscriber-specific information associated with the mobile terminal.

44. The base station controller system of claim 42 wherein the processing system is further operative to limit data rate capacity increases of the supplemental channel based on a maximum allowed data rate capacity defined for the mobile terminal.

* * * * *

UNITED STATES PATENT AND TRADEMARK OFFICE
CERTIFICATE OF CORRECTION

PATENT NO. : 7,193,966 B2
APPLICATION NO. : 09/888922
DATED : March 20, 2007
INVENTOR(S) : Gupta et al.

It is certified that error appears in the above-identified patent and that said Letters Patent is hereby corrected as shown below:

On the Title Page, in Field (73), under "Assignee", in Column 1, Line 1, delete "Telefonakitebolaget" and insert -- Telefonaktiebolaget --, therefor.

In Fig. 6, Sheet 6 of 7, for Tag "292", after "MAX" delete "]".

In Column 6, Line 42, delete "($Req_{13}$ Rate)" and insert -- (Req_Rate) --, therefor.

In Column 6, Line 55, delete "$Req_{13}$ Rate" and insert -- Req_Rate --, therefor.

In Column 6, Line 60, delete "$Assigned_{13}$ Rate" and insert -- Assigned_Rate --, therefor.

In Column 6, Line 61, delete "$Req_{13}$ Rate" and insert -- Req_Rate --, therefor.

In Column 6, Line 61, delete "$Initial_{13}$ Rate" and insert -- Initial_Rate --, therefor.

In Column 6, Line 62, delete "$Assigned_{13}$ Rate" and insert -- Assigned_Rate --, therefor.

In Column 6, Lines 63-64, delete "$FSCH_{13}$ Active" and insert -- FSCH_Active --, therefor.

In Column 6, Line 66, delete "$Guard_{13}$ Timer" and insert -- Guard_Timer --, therefor.

In Column 6, Line 67, delete "$Guard_{13}$ Timer" and insert -- Guard_Timer --, therefor.

In Column 7, Line 53, delete "$RLP_{13}$ Usage" and insert -- RLP_Usage --, therefor.

In Column 7, Line 58, delete "$RLP_{13}$ Usage" and insert -- RLP_Usage --, therefor.

In Column 8, Line 3, delete "$RLP_{13}$ Error" and insert -- RLP_Error --, therefor.

In Column 8, Line 7, delete "$RLP_{13}$ Error" and insert -- RLP_Error --, therefor.

In Column 9, Line 1, delete "$RLP_{13}$ Usage" and insert -- RLP_Usage --, therefor.

In Column 9, Line 2, delete "$MAX_{13}$ USAGE" and insert -- MAX_USAGE --, therefor.

In Column 9, Lines 3-4, delete "$RLP_{13}$ Usage" and insert -- RLP_Usage --, therefor.

UNITED STATES PATENT AND TRADEMARK OFFICE
CERTIFICATE OF CORRECTION

PATENT NO. : 7,193,966 B2
APPLICATION NO. : 09/888922
DATED : March 20, 2007
INVENTOR(S) : Gupta et al.

It is certified that error appears in the above-identified patent and that said Letters Patent is hereby corrected as shown below:

In Column 9, Line 8, delete "$MAX_{13}$ USAGE" and insert -- MAX_USAGE --, therefor.

In Column 9, Line 16, delete "$RLP_{13}$ Usage" and insert -- RLP_Usage --, therefor.

In Column 9, Lines 16-17, delete "$MAX_{13}$ USAGE" and insert -- MAX_USAGE --, therefor.

In Column 9, Line 26, delete "$MAX_{13}$ USAGE" and insert -- MAX_USAGE --, therefor.

In Column 9, Line 29, delete "$RLP_{13}$ Usage" and insert -- RLP_Usage --, therefor.

In Column 9, Line 30, delete "$RLP_{13}$ Error" and insert -- RLP_Error --, therefor.

In Column 9, Line 31, delete "$MAX_{13}$ ERROR" and insert -- MAX_ERROR --, therefor.

In Column 9, Line 36, delete "$MAX_{13}$ ERROR" and insert -- MAX_ERROR --, therefor.

In Column 9, Lines 46-47, delete "$MAX_{13}$ ERROR" and insert -- MAX_ERROR --, therefor.

In Column 9, Line 65, delete "$REQ_{13}$ RATE" and insert -- REQ_RATE --, therefor.

In Column 9, Line 66, delete "$REQ_{13}$ RATE" and insert -- REQ_RATE --, therefor.

In Column 10, Line 3, delete "$REQ_{13}$ RATE" and insert -- REQ_RATE --, therefor.

In Column 10, Line 9, delete "$CURRENT_{13}$ RATE" and insert -- CURRENT_RATE --, therefor.

In Column 10, Line 18, delete "(SCHS)" and insert -- (SCHs) --, therefor.

In Column 10, Line 28, delete "$REQ_{13}$ RATE" and insert -- REQ_RATE --, therefor.

In Column 10, Lines 34-35, delete "$REQ_{13}$ RATE" and insert -- REQ_RATE --, therefor.

UNITED STATES PATENT AND TRADEMARK OFFICE
CERTIFICATE OF CORRECTION

PATENT NO. : 7,193,966 B2
APPLICATION NO. : 09/888922
DATED : March 20, 2007
INVENTOR(S) : Gupta et al.

It is certified that error appears in the above-identified patent and that said Letters Patent is hereby corrected as shown below:

In Column 10, Line 35, delete "$REQ_{13}$ RATE" and insert -- REQ_RATE --, therefor.

In Column 10, Lines 64-65, delete "$CURRENT_{13}$ RATE" and insert -- CURRENT_RATE --, therefor.

In Column 10, Line 66, delete "$MIN_{13}$ RATE" and insert -- MIN_RATE --, therefor.

In Column 10, Line 67, delete "$MIN_{13}$ USAGE" and insert -- MIN_USAGE --, therefor.

In Column 11, Line 1, delete "$MIN_{13}$ RATE" and insert -- MIN_RATE --, therefor.

In Column 11, Line 8, delete "$MIN_{13}$ RATE" and insert -- MIN_RATE --, therefor.

In Column 11, Lines 8-9, delete "MIN13 USAGE" and insert -- MIN_USAGE --, therefor.

In Column 11, Line 24, delete "Usage13 Limit" and insert -- Usage_Limit --, therefor.

In Column 11, Line 26, delete "Usage13 Limit" and insert -- Usage_Limit --, therefor.

In Column 11, Line 40, delete "RLP13 Usage" and insert -- RLP_Usage --, therefor.

In Column 11, Line 40, delete "Usage13 Limit[1/8]" and insert -- Usage_Limit[1/8] --, therefor.

In Column 11, Line 41, delete "$REQ_{13}$ RATE" and insert -- REQ_RATE --, therefor.

In Column 11, Lines 41-42, delete "$CURRENT_{13}$ RATE" and insert -- CURRENT_RATE --, therefor.

In Column 11, Line 42, delete "$REQ_{13}$ RATE" and insert -- REQ_RATE --, therefor.

In Column 11, Line 44, delete "$REQ_{13}$ RATE" and insert -- REQ_RATE --, therefor.

In Column 11, Line 45, delete "$MIN_{13}$ RATE" and insert -- MIN_RATE --, therefor.

In Column 11, Line 46, delete "$RLP_{13}$ Error" and insert -- RLP_ Error --, therefor.

UNITED STATES PATENT AND TRADEMARK OFFICE
CERTIFICATE OF CORRECTION

PATENT NO. : 7,193,966 B2 Page 4 of 4
APPLICATION NO. : 09/888922
DATED : March 20, 2007
INVENTOR(S) : Gupta et al.

It is certified that error appears in the above-identified patent and that said Letters Patent is hereby corrected as shown below:

In Column 11, Lines 47-48, delete "$MAX_{13}$ ERROR" and insert -- MAX_ERROR --, therefor.

In Column 12, Line 8, delete "$MAX_{13}$ ERROR" and insert -- MAX_ERROR --, therefor.

In Column 17, Line 30, in Claim 39, delete "usage;" and insert -- usage threshold; --, therefor.

Signed and Sealed this

Second Day of September, 2008

JON W. DUDAS
*Director of the United States Patent and Trademark Office*